(12) United States Patent
Goldman et al.

(10) Patent No.: US 9,466,011 B2
(45) Date of Patent: Oct. 11, 2016

(54) METHOD AND SYSTEM FOR COORDINATING BETWEEN IMAGE SENSORS

(71) Applicant: ELBIT SYSTEMS LAND AND C4I LTD., Netanya (IL)

(72) Inventors: Benny Goldman, Givatayim (IL); Ido Bergman, Rehovot (IL)

(73) Assignee: Elbit Systems Land and C4I Ltd., Netanya (IL)

( * ) Notice: Subject to any disclaimer, the term of this patent is extended or adjusted under 35 U.S.C. 154(b) by 0 days.

(21) Appl. No.: 14/895,676

(22) PCT Filed: May 28, 2014

(86) PCT No.: PCT/IL2014/050480
§ 371 (c)(1),
(2) Date: Dec. 3, 2015

(87) PCT Pub. No.: WO2014/195936
PCT Pub. Date: Dec. 11, 2014

(65) Prior Publication Data
US 2016/0125267 A1   May 5, 2016

(30) Foreign Application Priority Data
Jun. 4, 2013  (IL) .......................................... 226751

(51) Int. Cl.
| | |
|---|---|
| *H04N 13/00* | (2006.01) |
| *G06K 9/62* | (2006.01) |
| *G06T 7/00* | (2006.01) |
| *G06T 5/00* | (2006.01) |
| *H04N 13/02* | (2006.01) |

(52) U.S. Cl.
CPC ............. *G06K 9/6211* (2013.01); *G06T 5/002* (2013.01); *G06T 7/0028* (2013.01); *G06T 7/0044* (2013.01); *H04N 13/0022* (2013.01); *H04N 13/0203* (2013.01); *G06T 2207/10016* (2013.01); *G06T 2207/20101* (2013.01); *G06T 2207/30212* (2013.01); *G06T 2207/30232* (2013.01)

(58) Field of Classification Search
CPC ................. G06T 7/0028; G06T 2207/10016; G06T 2207/20101
USPC ........................................................... 348/47
See application file for complete search history.

(56) References Cited

U.S. PATENT DOCUMENTS

| | | | |
|---|---|---|---|
| 2008/0031493 A1* | 2/2008 | Brogren | G06K 9/00369 382/103 |
| 2009/0055204 A1* | 2/2009 | Pennington | G07F 17/32 463/29 |

(Continued)

FOREIGN PATENT DOCUMENTS

| | | |
|---|---|---|
| CA | 2703314 A1 | 11/2010 |
| EP | 1736928 A1 | 12/2006 |

OTHER PUBLICATIONS

The International Preliminary Report on Patentability for PCT/IL2014/050480 dated Dec. 8, 2015, pp. 1-5.

(Continued)

*Primary Examiner* — Jamie Atala
*Assistant Examiner* — Nguyen Truong
(74) *Attorney, Agent, or Firm* — McDonnell Boehnen Hulbert & Berghoff LLP

(57) ABSTRACT

Method and system for coordinating between separate image sensors imaging a mutual area of interest at different imaging perspectives. A target point is designated on a first image acquired by a first image sensor. Feature points are defined and characterized on the first image and transmitted over a data communication link to a second image sensor. The target point is identified in a second image acquired by the second image sensor using an iterative convergence operation. The first iteration involves locating feature points in the second image corresponding to the defined first image feature points. Subsequent iterations involve locating feature points in a subregion of the second image corresponding to decreasing subsets of first image feature points, the subregion defined by the feature point cluster located in the previous iteration. When a termination condition is reached, the remaining cluster of located feature points is established to represent the target point.

20 Claims, 5 Drawing Sheets

(56) References Cited

U.S. PATENT DOCUMENTS

2009/0055205 A1* 2/2009 Nguyen ............ G06K 9/00771
463/29
2010/0310182 A1 12/2010 Kroepfl et al.
2014/0333775 A1* 11/2014 Naikal .................. H04N 7/181
348/159

OTHER PUBLICATIONS

The International Search Report (ISR) with Written Opinion for PCT/IL2014/050480 dated Sep. 4, 2014, pp. 1-7.

* cited by examiner

METHOD AND SYSTEM FOR COORDINATING BETWEEN IMAGE SENSORS

CROSS-REFERENCE TO RELATED APPLICATION

This application is a U.S. national phase of International Application No. PCT/IL2014/050480, filed May 28, 2014, which claims priority to Israeli Patent Application No. 226751, filed Jun. 4, 2013, the disclosures of which are hereby incorporated by reference in their entirety.

FIELD OF THE DISCLOSED TECHNIQUE

The disclosed technique generally relates to image processing and registration, target identification, and narrow-band communication.

BACKGROUND OF THE DISCLOSED TECHNIQUE

It is sometimes advantageous to image an area of interest using multiple cameras or sensors with different imaging characteristics, such as in surveillance or reconnaissance applications. For example, the sensors may be arranged at separate locations with different orientations, may have different field of views or different optical resolutions, and/or may operate at different spectral domains. The image data associated with each individual sensor is thereby augmented, and can serve to compensate for the respective shortcomings of the other sensors. The aggregated image data may be processed to generate a unified image that can then be displayed. Alternatively, different images associated with different sensors may be displayed separately, such as at display devices situated at different locations. Each of the operators would consequently view different versions of the same area of interest, such as at slightly different orientations and/or focal lengths, which may result in slightly varying image features at each displayed image.

Two remote parties viewing different images that portray a mutual area of interest may seek to communicate information about the area in terms of their respective image. For example, one party may wish to convey to the other party information with respect to a point of interest as it appears on his image. Since each party is viewing a different image, the transmittal of an entire image (or sufficient image data to enable accurate reconstruction of the image) would require a large bandwidth data link and consume substantial time and resources (in terms of both computational cost and transmission overhead), which may be unavailable and/or undesirable. The use of location or orientation determining systems associated with each sensor, such as a global positioning system (GPS) or inertial navigation system (INS), can help simplify coordination between sensor data, but would also add significant processing time as well as the increased weight and cost of the additional infrastructure.

Various techniques for image registration, i.e., determining an optimal transformation between different images of a common scene, are known in the art. One approach involves selecting a reference point on one image and then identifying the location of the reference point in the other image. If both reference points lie on the same image plane, then a straightforward linear transformation model can be established between the images, allowing for the conversion of other non-reference points, using interpolation if necessary. However, if there are varying depths between the terrain in each of the images, and thus the reference points reside on different image planes, it would preclude the application of a direct transformation model between the two images, which would result in an imprecise registration and substantially increase the margin of error. In this case, it would be necessary to know the relative locations and the direction or viewing angle of each image sensor (and perhaps additional imaging characteristics as well), in order to perform accurate image registration between their respective images.

U.S. Pat. No. 7,925,117 to Hamza et al, entitled "Fusion of Sensor Data to Form an Integrated Image", is directed to a system and method for forming a combined sensor and synthetic image that provides guidance to vehicle operators in limited or no visibility conditions. An image registration process is used to fuse the images. At least two landmarks are identified, an image gradient is extracted from a sensor image dataset for each of the landmarks, and a corresponding image gradient is extracted from a synthetic image dataset for each of the landmarks. A center of mass is calculated for each of the image gradients extracted from the sensor and synthetic image datasets. The displacement is calculated between corresponding image gradients from the sensor and synthetic image datasets centered at the calculated centers of mass. The images are stabilized by minimizing the displacement to form the integrated image.

U.S. Pat. No. 7,957,584 to Nafaji et al., entitled "Fast Object Detection for Augmented Reality Systems", is directed to a method for real-time pose estimation of an object in a sample view. A set of stable feature regions of the object are selected in an off-line environment. Multiple view descriptors of a view set for each selected feature region are incorporated into a statistical model, in an off-line environment. A search area of the statistical model is constrained using geometric consistencies between the statistical model and the sample view. The constrained search area is searched to match regions in the statistical model with regions in the sample view.

U.S. Pat. No. 8,036,678 to Goldenberg et al., entitled "Real-Time Geographic Information System and Method", is directed to a system and method for dynamic distribution of location-related information between users with different perspective views of a common region of interest. A shared location reference having a defined coordinate system is provided for the region of interest. The location reference may include at least one reference image chosen from an aerial image, a satellite image, and an orthophoto, and may also include an elevation map or a digital surface model. The shared location reference may be stored at a remote database. A mapping is derived between the current perspective view of a first user and the location reference. A point-of-interest is designated within the first user's current perspective view, and the corresponding coordinates of the point-of-interest in the shared location reference is derived using the first user's mapping. The location of the coordinates within a second user's perspective view is derived using the second user's mapping, and the point-of-interest is displayed in the context of the second user's perspective view.

U.S. Pat. No. 8,260,036 to Hamza et al., entitled "Object Detection Using Cooperative Sensors and Video Triangulation", is directed to a method and apparatus for detecting and tracking a target object, particularly for the purpose of docking or target avoidance. Images of a field of view are captured by at least two cameras mounted on one or more moving platforms at different perspectives. The images are analyzed to identify landmarks which can be used to track the targets position from frame to frame. The images are fused with information about the target and/or the platform position from at least one sensor. The fused information is processed to triangulate the position of the target and track its position relative to the moving platform, or the position of the platforms with respect to the location of the target, either one of which is displayed.

Bai, Yang, "Feature-based Image Comparison and Its Application in Wireless Visual Sensor Networks", PhD diss., University of Tennessee, 2011, discusses the feature-based image comparison method, which compares different images and aims to find similar image pairs using a set of local features from each image. The image feature is a numerical representation of the raw image, which can be more compact in data volume. A pair of corner detectors is proposed for the step of feature detection. The first detector is based on the Discrete Wavelet Transform that provides multi-scale corner point detection and the scale selection is achieved through a Gaussian convolution approach. The second detector is based on a linear un-mixing model, which treats a corner point as the intersection of two or three "line" bases in a 3×3 region. The line bases are extracted through a constrained Nonnegative Matrix Factorization (NMF) approach and the corner detection is accomplished through counting the number of contributing bases in the linear mixture. An effective dimensionality reduction algorithm for the high dimensional Scale Invariant Feature Transform (SIFT) descriptors is proposed for the step of descriptor calculation. A set of 40 SIFT descriptor bases are extracted through constrained NMF from a large training set and all SIFT descriptors are then projected onto the space spanned by these bases, achieving dimensionality reduction.

SUMMARY OF THE DISCLOSED TECHNIQUE

In accordance with one aspect of the disclosed technique, there is thus provided a method for coordinating between separate image sensors, each imaging a mutual area of interest at a different imaging perspective. The method includes the procedure of designating at least one target point on a first image of an area of interest acquired via a first image sensor at a first imaging perspective. The method further includes the procedure of defining and characterizing a plurality of feature points on the first image in the vicinity of the designated target point. The method further includes the procedure of transmitting information associated with said first image over a data communication link to at least a second image sensor situated at a separate location from the first image sensor. The method further includes the procedure of identifying the target point in at least a second image of the area of interest acquired by the second image sensor at a second imaging perspective, by implementing an iterative convergence operation towards the target point location in the second image. In a first iteration of the iterative convergence operation, the feature points corresponding to the feature points defined in the first image are located in the second image. In each subsequent iteration of the iterative convergence operation, the feature points corresponding to a subset of the feature points defined in the first image are located in a subregion of the second image, where the second image subregion is defined by the cluster of feature points located in the previous iteration, and where the subset of feature points decreases relative to the previous iteration. When a termination condition of the iterative convergence operation is reached, the remaining cluster of located feature points in the second image is established to represent the target point. The procedure of defining and characterizing a plurality of feature points may include establishing a respective signature for each feature point, and locating corresponding feature points may include comparing the signatures of the respective points and selecting the point with the closest signature. The imaging perspective may include: the position of the image sensor, the viewing angle of the image sensor, the range of the image sensor to the area of interest, the field of view of the image sensor, the focal length of the image sensor, the optical resolution of the image sensor, the dynamic range of the image sensor, the sensitivity of the image sensor, the signal-to-noise ratio (SNR) of the image sensor, and/or lens aberrations of the image sensor. The method may further include the procedure of calculating a quantitative index related to the level of accuracy of the iterative convergence operation, the quantitative index being a function of the degree of correlation between feature point pairings in the first image and the second image. The termination condition may include: when the subset of feature points defines a radius from the target point sufficiently close to zero, when the size of the subset of feature points is within a threshold, when the size of the subregion of the second image is within a threshold, when the size of the subregion of the second image has not decreased from the previous iteration, when no corresponding feature points are located in the second image, when the number of corresponding feature points located in the second image is below a threshold, and/or after a selected number of iterations. The method may further include the procedure of obtaining at least one parameter of at least one of the image sensors. The parameter may be: the global position of the image sensor, the relative position of the image sensor with respect to the area of interest, the viewing angle of the image sensor, the range from the image sensor to the area of interest, the focal length of the image sensor, the field of view of the image sensor, lens aberrations of the image sensor, and/or at least one imaging characteristic of the image sensor. The method may further include the procedure of limiting the area in the second image for implementing the iterative convergence operation based on the at least one obtained parameter. The information associated with the first image may include the feature points. The information associated with the first image may be transmitted over the data communication link in a compressed format. The information associated with the first image may be transmitted over a narrowband channel. The method may further include the procedure of providing an indication that the designated target point cannot be identified in the second image, if a sufficient number of feature points cannot be located in the second image in at least one iteration of the iterative convergence operation. The method may further include the procedure of tracking the location of the designated target point over time in a sequence of images of the area of interest.

In accordance with another aspect of the disclosed technique, there is thus provided a system for coordinating between separate image sensors, each imaging a mutual area of interest at a different imaging perspective. The system includes a first image sensor, a first image processor, a second image sensor, and a second image processor. The first image sensor acquires at least one image of an area of interest at a first imaging perspective. The first image processor is coupled with the first image sensor and designates at least one target point in a first acquired image, and defines and characterizing a plurality of feature points on the first image in the vicinity of the designated target point. The second image sensor is situated at a separate location from the first image sensor, and receives information associated with the first image transmitted from the first image sensor over a data communication link. The second image processor is coupled with the second image sensor and identifies the target point in at least a second image of the area of interest acquired by the second image sensor at a second imaging perspective, by implementing an iterative convergence operation towards the target point location in the second image. In a first iteration of the iterative convergence operation, the feature points corresponding to the feature points defined in the first image are located in the second image. In each subsequent iteration of the iterative convergence operation, the feature points corresponding to a subset of the feature points defined in the first image are located in a subregion of the second image, where the second image subregion is defined by the cluster of feature points located in the previous iteration, and where the subset of feature points decreases relative to the previous iteration. When a termination condition of the iterative convergence operation is reached, the remaining cluster of located feature points in the second image is established to represent the target point. The system may further include at least one measurement unit, for obtaining at least one parameter of at least one of the image sensors. The measurement unit may include: a global positioning system (GPS), a compass, an inertial navigation system (INS), and/or a rangefinder. The information associated with the first image may include the feature points. The information associated with the first image may be transmitted over the data communication link in a compressed format. The data communication link may be a narrowband channel. The system may further include a display, for displaying the first image and/or second image.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

The disclosed technique overcomes the disadvantages of the prior art by providing a method and system for coordinating between multiple image sensors, where each image sensor images a mutual area of interest at a different imaging perspective. The disclosed technique provides image registration, to enable information associated with at least one point designated on an image acquired by one of the image sensors to be communicated in terms of the corresponding point on another image acquired by at least another of the image sensors. The image registration may be implemented without relying on a common reference system or other supplemental data, such as information concerning the state of the image sensors or their imaging characteristics during image acquisition. In addition, the image registration involves transmission of only a small quantity of data between the remote image sensors, allowing for transmission over a narrowband channel.

Figure 1:
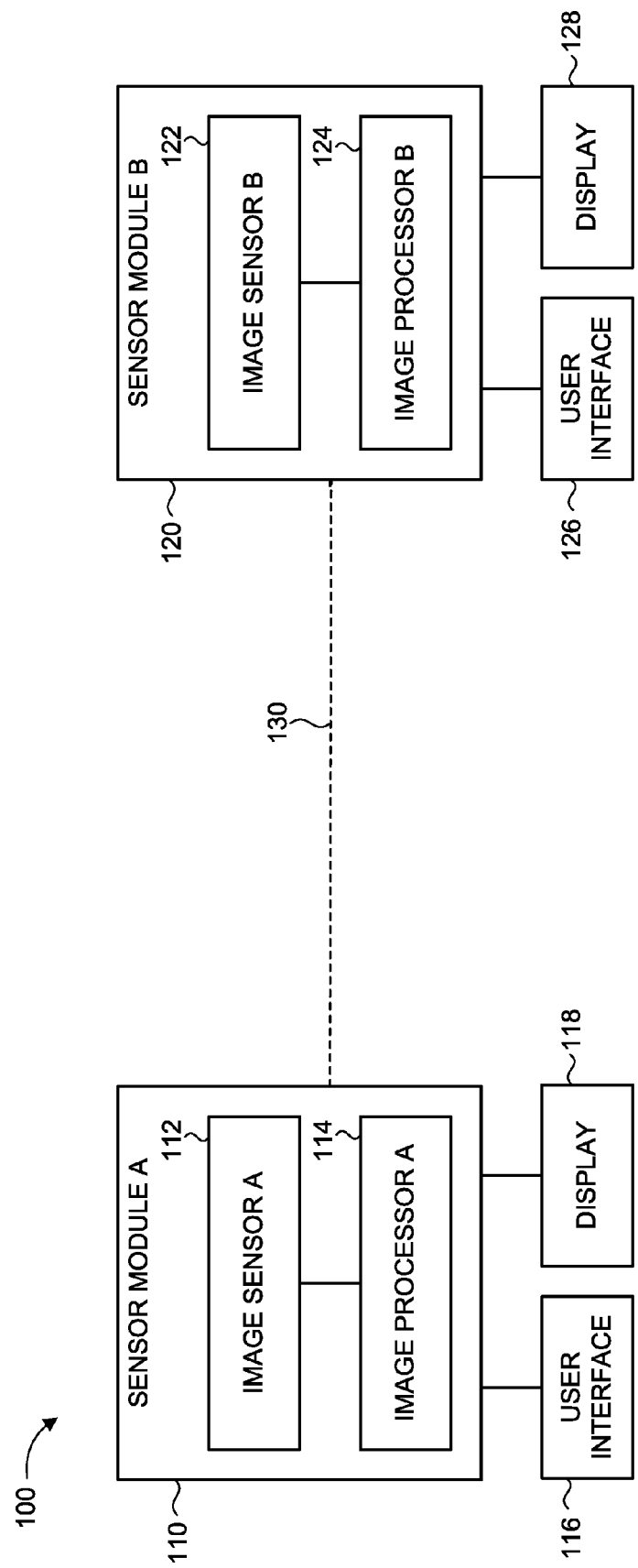
FIG. 1 is a schematic illustration of a system for coordinating between a pair of image sensors imaging a mutual area of interest at different imaging perspectives, constructed and operative in accordance with an embodiment of the disclosed technique.

Reference is now made to FIG. 1, which is a schematic illustration of a system, generally referenced 100, for coordinating between a pair of image sensors imaging a mutual area of interest at different imaging perspectives, constructed and operative in accordance with an embodiment of the disclosed technique. System 100 includes a pair of sensor modules 110 and 120, situated at separate locations. For example, the sensor modules may be located remotely from one another, such as being separated by a distance of several kilometers (km), or may be substantially close to one another, such as being only a few centimeters (cm) apart. Sensor module 110 (also referred to as "sensor module A") includes an image sensor 112 ("image sensor A") and an image processor 114 ("image processor A"). Correspondingly, sensor module 120 ("sensor module B") includes an image sensor 122 ("image sensor B") and an image processor 124 ("image processor B"). A data communication channel 130 enables data communication between sensor module 110 and sensor module 120. System 100 further includes a user interface 116 and a display 118 coupled with sensor module 110, and a user interface 126 and a display 128 coupled with sensor module 120.

Image sensors 112, 122 may be any type of device capable of acquiring and storing an image representation of a real-world scene, including the acquisition of any form of electromagnetic radiation at any range of wavelengths (e.g., light in the visible or non-visible spectrum, ultraviolet, infrared, radar, microwave, RF, and the like). For example, at least one of image sensors 112, 122 may be a FLIR (forward looking infrared) camera. The operational domain of image sensors 112, 122 may be distinct, or may overlap, at least partially, with one another. Image sensors 112, 122 are operative to acquire at least one image frame, such as a sequence of consecutive image frames representing a video image, which may be converted into an electronic signal for subsequent processing and/or transmission. Accordingly, the term "image" as used herein refers to any form of output from an aforementioned image sensor, including any optical or digital representation of a scene acquired at any spectral region.

Data communication channel 130 may be embodied by any suitable physical or logical transmission medium operative for conveying an information signal between two points, via any type of channel model (digital or analog) and using any transmission protocol (e.g., radio, HF, wireless, Bluetooth, and the like). According to an embodiment of the disclosed technique, data communication channel 130 is a narrowband channel. Sensor modules 110, 120 include transceivers (not shown) operative for transmitting and/or receiving data signals through communication channel 130.

Each of image sensors 112, 122 is directed toward a common scene from a different orientation (viewing angle). In particular, image sensor 112 images the scene from a first viewing angle, thereby acquiring at least one image at a first imaging perspective, while image sensor 122 images the scene from a second (different) viewing angle, thereby acquiring at least one image at a second imaging perspective. Image sensors 112, 122 may also differ in at least one additional imaging characteristic. For example, each of image sensors 112, 122 may be characterized by a unique: field of view; focal length; optical resolution; dynamic range; sensitivity; signal-to-noise ratio (SNR); lens aberrations; and/or other parameters or characteristics. Each of image sensors 112, 122 may be mounted on a fixed stationary platform adjacent to the area of interest. Alternatively, image sensors 112, 122 may be mounted onto a mobile platform or be otherwise portable, and may change position and/or orientation while acquiring the images, such that each image of an individual image sensor is associated with a unique imaging perspective. Similarly, other imaging characteristics of image sensors 112, 122 may be fixed (i.e., remain constant), or may be dynamically adjusted such that each image is associated with the corresponding imaging characteristics with which that image was acquired. User interface 116, 126 allows an operator to remotely control the position and orientation and/or other imaging characteristics of the respective image sensor 112, 122, as well as to select points of interest on the image. The light detected by each of image sensors 112, 122 is converted to a digital signal representation of the images of the captured scene, such as in terms of pixel values, and then fed to the respective image processor 114, 124 for further processing. The image representation may also be provided to display 118, 128 for displaying the image. It is noted that user interfaces 116, 118 and displays 126, 128 are optional components of system 100. System 100 may operate, partially or fully, in an automated manner.

Figure 2:
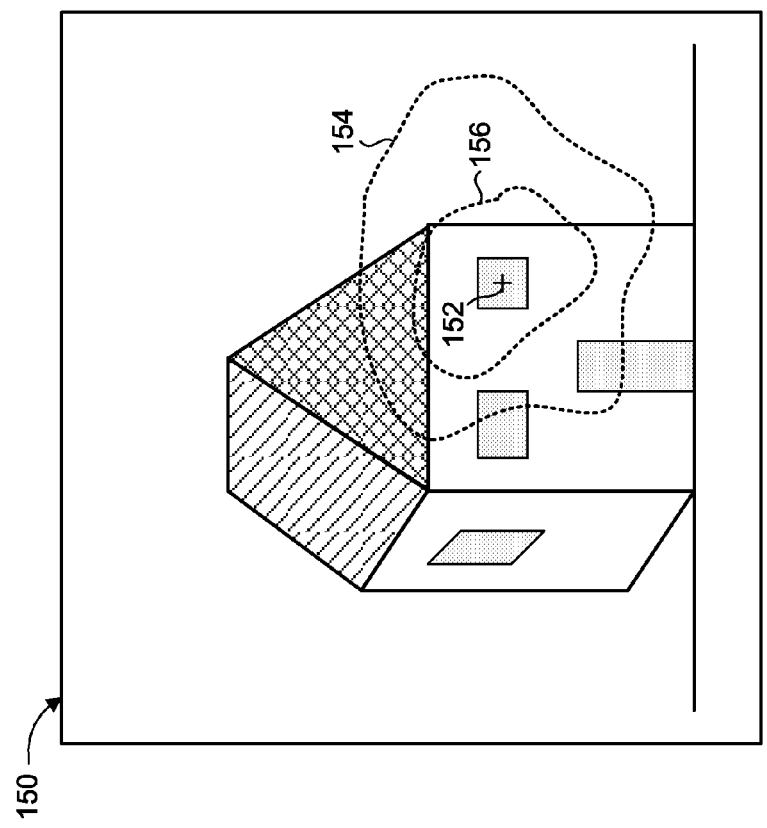
FIG. 2 is a schematic illustration of an exemplary pair of images acquired by the image sensors of FIG. 1, in accordance with an embodiment of the disclosed technique.
Figure 2:
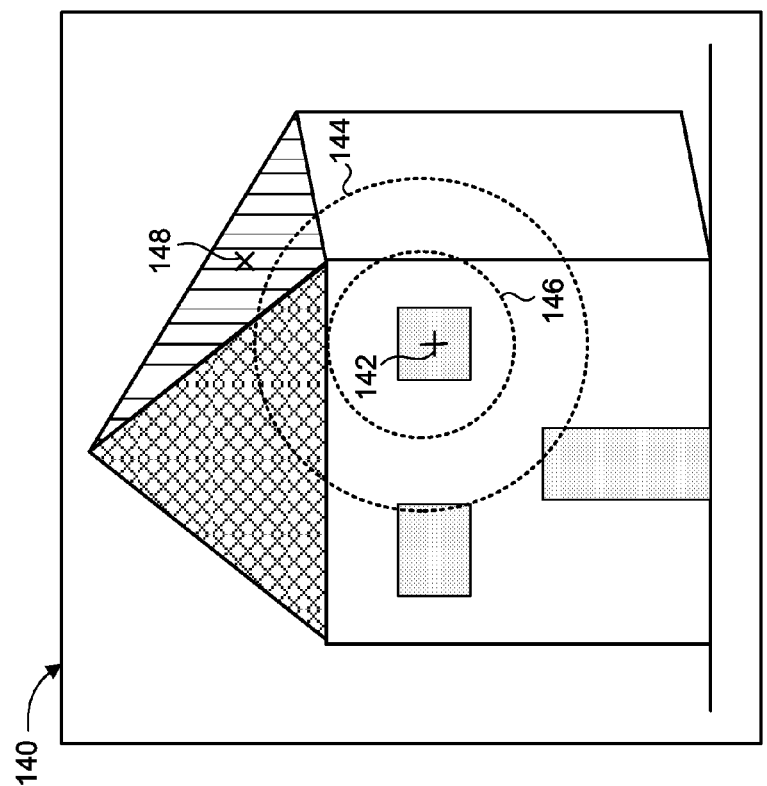

Reference is now made to FIG. 2, which is a schematic illustration of an exemplary pair of images acquired by the image sensors (112, 122) of FIG. 1, in accordance with an embodiment of the disclosed technique. A first image 140 of an area of interest, depicted as a house, is acquired by image sensor 112 with one viewing angle and focal length. A second image 150 of the same house is acquired by image sensor 122 with another viewing angle and another focal length, where there is at least some overlap between the respective areas that are imaged by sensors 112 and 122. Consequently, the portions of the house that are visible in image 140 differ to some extent from the portions of the house visible in image 150. For example, image 140 depicts the house from a front-right view perspective, while image 150 depicts the same house from a front-left view perspective. In addition, the house appears smaller (i.e., scaled down) in image 150 as compared to the appearance of the house in image 140. It is noted that there may be other variations between the two images, depending on the particular variations among the respective image sensors 112, 122 during the acquisition of the images.

An operator of sensor module 110 (i.e., "a first operator") seeks to notify an operator of sensor module 120 (i.e., "a second operator") of a particular object or region that appears on image 140. The first operator views image 140 on display 118, and designates at least one point of interest on image 140. Referring to FIG. 2, the first operator selects a point at the center of the right side window at the front of the house as a point of interest or "target point", such as by marking the target point (referenced 142) on image 140 with user interface 116. Thus, in this example, the first operator seeks to communicate to the second operator information associated with the right-side window of the house. It is noted that the designated points may correspond to the collection of pixels on the image that represent a unified object (e.g., the operator may select the entire right-side window as a "region of interest" on image 140). The selection of the target point may also be performed automatically, such as based on predetermined criteria. For example, the target point may be automatically selected to be the center of the image. For example, the first operator may be a marksman or a sniper, who is viewing an area of interest at a first viewing angle via the eyepiece of a telescopic sight. The sensor module of the first operator may be configured to automatically designate the area centered at the reticle of the eyepiece as the target. The relevant information is subsequently transmitted to a second party, who may be another marksman viewing the potential target from a different viewing angle.

Following the designation of the target point 142 on the first image 140, image processor 114 defines a plurality of feature points in the vicinity of the designated target point 142. Each feature point is associated with a unique signature. For example, the signature may be characterized by a partial invariant to an affine transform. Image processor 114 defines and characterizes a plurality of feature points located within a particular distance from the designated target point 142. For example, all of the defined featured points are located within a certain radius with respect to the designated target point, such that the defined feature points span a limited portion of the entire image. For example, referring to FIG. 2, a set of feature points are selected within region 144 of first image 140. Each feature point may represent an individual image pixel or a collection of pixels grouped together. Subsequently, all of the feature points are compressed and then transmitted all at once to sensor module 120 over data communication channel 130. It is noted that the substantially small data size of the compressed data (e.g., a few kilobytes for each transmission) allows for substantially rapid transmission over narrowband channels, regardless of the data size of the original image. Sensor module 110 may alternatively transmit to sensor module 120 information relating to image 140, such as a copy of the image or a portion thereof, rather than transmitting the actual feature points, in which case the designation of feature points on image 140 is implemented at sensor module 120 by image processor 124.

Image processor 124 of sensor module 120 receives the transmitted feature points, and proceeds to perform an iterative convergence operation based on the feature points in order to gradually converge onto the target point location on the second image 150. The convergence operation involves successively identifying feature points on the second image that correspond to different subsets of the feature points defined in the first image. Over each iteration of the convergence operation, gradually decreasing subsets of feature points surrounding the target point are identified in gradually decreasing subregions of the second image. Specifically, a first subset of feature points in image 140 are initially processed by image processor 124, which locates a corresponding set of points in image 150. For example, the first subset of feature points includes all the defined feature points located within a first radius of target point 142, such as all of the feature points within image region 144. The corresponding feature points identified in image 150 forms a cluster of points delimiting a first subregion 154 of image 150. Subsequently, image processor 124 locates a second subset of feature points of image 140 within the first subregion 154 of image 150, where the second subset of feature points is smaller than the first subset. For example, the second subset of feature points includes all the defined feature points located within a second radius of target point 142 which is less than the first radius, such as all of the feature points within image region 146. The corresponding identified feature points forms a cluster of points delimiting a second subregion 152 of image 150, which is encompassed within the first subregion of the previous iteration. The aforementioned process continues over multiple iterations until the subset of feature points has sufficiently converged onto the target point (e.g., within a sub-pixel resolution level), upon which the determined corresponding point(s) on the second image are established as representing the target point(s) of the first image. The corresponding set of points are determined by examining the signatures associated with the first image feature points, and then identifying the points on the second image which have the closest possible signatures to those signatures (e.g., by selecting the point signature in the second image with the largest correlation coefficient with respect to a given first image feature point signature). In general, the iterative process continues until a given iteration fails to improve upon the results of the previous iteration or a particular end condition is met. For example, the convergence operation may terminate when the subset of feature points defines a radius from the target point sufficiently close to zero, such as when the feature points are located within a predetermined margin from the target point in the first image (e.g., within a single image pixel), or correspondingly when the size of the cluster of feature points identified in the second image is within a predetermined margin. Alternatively, the convergence operation terminates when the size of the subregion defined by the cluster of identified feature points has not decreased in relation to that of the previous iteration. In further examples, the convergence operation may terminate when no corresponding feature points are identified in the second image, or when the number of identified feature points is less than a threshold value, or after a selected number of iterations. Referring to FIG. 2, image processor 124 implements the aforementioned iterative convergence operation and eventually establishes point 152 on image 150 to represent the target point, corresponding to designated target point 142 on image 140.

Figure 3:
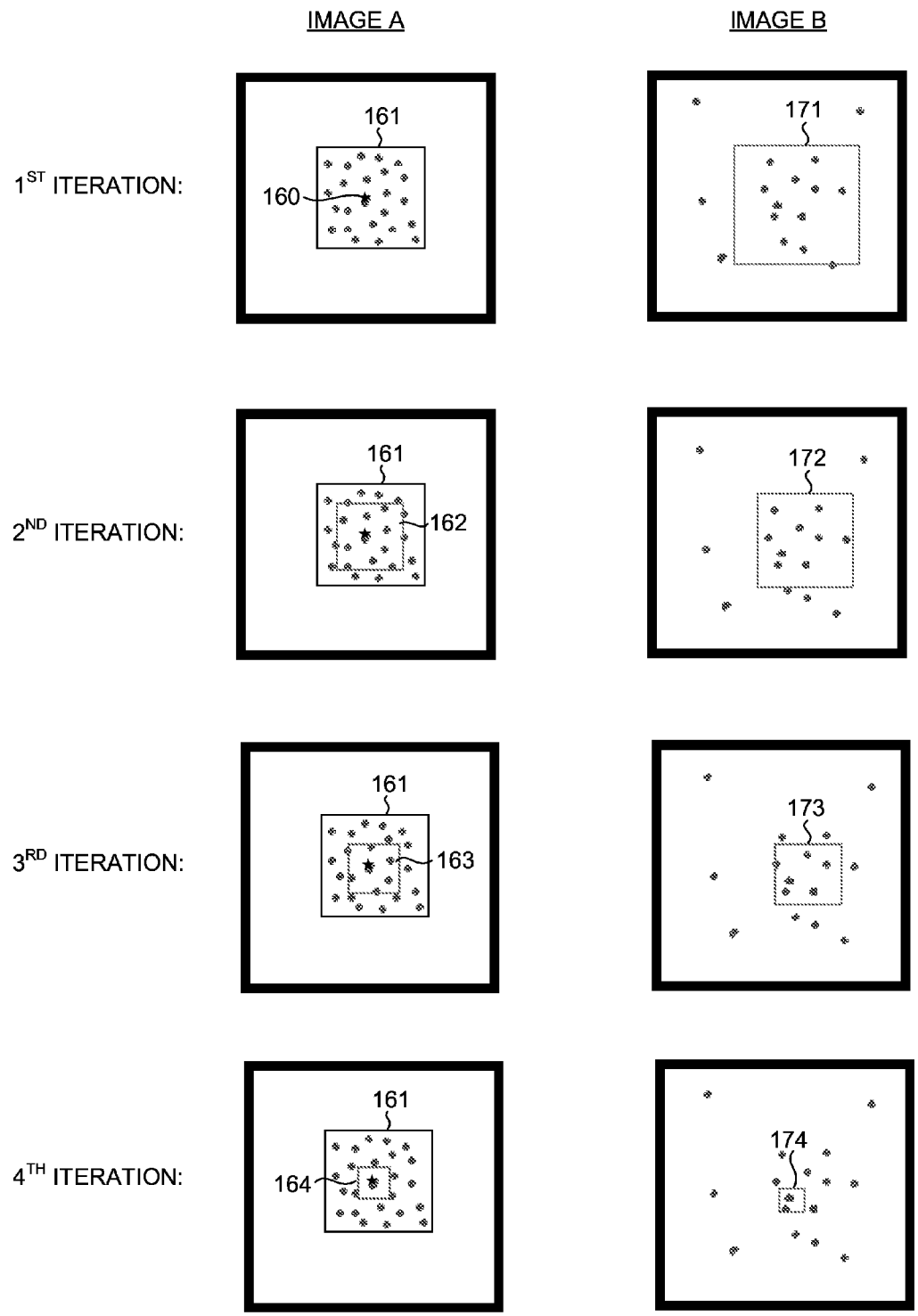
FIG. 3 is a schematic illustration of an exemplary implementation of the iterative convergence operation, operative in accordance with an embodiment of the disclosed technique.

Reference is now made to FIG. 3, which is a schematic illustration of an exemplary implementation of the iterative convergence operation, operative in accordance with an embodiment of the disclosed technique. "Image A" represents an image acquired by image sensor A that includes a designated target point 160, which it is desired to locate on "image B" acquired by image sensor B (where images A and B include at least some overlap of a mutual area of interest). A collection of feature points are defined on image A in the vicinity of target point 160, such that all the feature points fall within image region 161 of image A. In a first iteration of the convergence operation, image processor B attempts to locate in image B all of the feature points of region 161 (representing all the feature points defined in image A). Image processor B searches throughout the entirety of image B, and identifies at least a portion of the feature points of region 161, where some of the located points may represent errors or false positive identifications. The identified cluster of feature points fall within region 171 of image B. In a second iteration of the convergence operation, image processor B attempts to locate only the points in image B corresponding to the feature points within region 162 of image A, where region 162 is encompassed within region 161 and thus includes fewer feature points than region 161. When attempting to locate the feature points of region 162, image processor B searches only within the cluster of points identified in the previous iteration, i.e., within region 171 of image B. The feature points identified in image B form a cluster that delimits a region 172, which is a subregion of (i.e., is encompassed within) region 171. The feature points identified in region 172 of image B may also include some errors or false positives, though likely fewer than in relation to that of the previous iteration. The convergence operation continues in this manner, with the size of the regions of identified feature points successively decreasing and gradually approaching zero. In particular, the feature points within region 163 of image A are processed and the corresponding points identified within region 173 of image B in the third iteration, where regions 163 and 173 are encompassed within regions 162 and 172, respectively. In the fourth iteration, the feature points within region 164 of image A are processed and the corresponding points identified within region 174 of image B, where regions 164 and 174 are encompassed within the respective regions 163 and 173. The convergence operation may terminate at this stage and the at least one feature point delimiting region 174 may be established as corresponding to the target point 160. Alternatively, further iterations may be implemented until a sufficient termination condition is met, upon which the target point is established in image B. While the different image subregions in FIG. 3 are depicted as a box or a square region, they may generally correspond to any suitable shape, and may represent any size or image portion relative to the entire image.

It is noted that corresponding feature points may not necessarily reside on the same image plane in the two images, since the points may represent different terrain depths for each imaging perspective. However, when sufficiently small image subregions are taken into account, then an assumption of a common image plane may be sufficiently valid, allowing for a linear transformation to be established between those points. According to an embodiment of the disclosed technique, a quantitative index is established to measure the accuracy of the iterative convergence operation. For example, the quantitative index may be calculated as a function of the degree of correlation between all of the feature point pairings in the two images (i.e., the selected feature point(s) in image 140 and the identified corresponding point(s) in image 150), where the degree of correlation is based on a weighted comparison formula. For each iteration of the convergence operation, a comparison metric may be determined for the degree of correlation between the set of feature points in image 140 and the corresponding points in image 150 determined in that particular iteration. The collection of comparison metrics for all of the iterations of the convergence operation would then constitute the quantitative index. Alternatively, only the comparison metric associated with the final iteration of the convergence operation is taken into account. The quantitative index may provide an indication of the margin of error in the iterative convergence operation, and thus of the overall accuracy of the target point location established in the second image. For example, if quantitative index values fall below some predetermined threshold level, the margin of error may be considered unacceptably high. Additionally, the quantitative index may be utilized to adjust and improve the results of the iterative convergence operation if necessary. Optionally, sensor module 120 may calculate the quantitative index and then transmit the information (e.g., at least one value associated with the calculated quantitative index) back to sensor module 110.

It is appreciated that the method of the disclosed technique may also provide an indication if the designated point of interest in the first image is completely absent from the second image. Namely, if following the final iteration of the convergence operation, the degree of correlation between the final set of feature point(s) and the designated target point(s) in the first image is below some threshold value, then the target point may be deemed to be absent from the second image. Alternatively, the target point may be deemed absent from the second image if the termination condition is reached relatively early in the iterative convergence operation. For example, referring to FIG. 2, the right side region of the roof of the house is visible in the first image 140, but does not appear at all in the second image 150. Accordingly, if the operator of sensor module 110 designates a point 148 on that portion of the image (i.e., on the right side of the roof), then an indication may be eventually provided to sensor module 120 that the designated target point 148 is not present in the image 150. Likewise, if a sufficient number of feature points cannot be located in the second image, then it may be determined that first and second images represent different imaged scenes that lack a sufficient degree of overlap between them. At least one of the sensor modules may then be prompted to select a different image that would allow for the coordination of a common target point.

The communication between sensor modules 110 and 120 via channel 130 may be unidirectional, involving only the transmission of the feature points to sensor module 120. Alternatively, the communication may be bidirectional, and may include additional relevant information or notifications. For example, sensor module 120 may transmit an acknowledgement message back to sensor module 110 to indicate that the feature points were successfully received, and/or an acknowledgement message to indicate that a corresponding target point 152 was successfully established. In another example, sensor module 110 may send sensor module 120 a copy of the image 140 of the area of interest, to enable sensor module 120 to perform the coordination of the target point on a suitable corresponding image 150 (i.e., one that has sufficient overlap with the area of interest of the first image 140). Sensor module 120 may then send back a notification that the received image is no longer relevant for target coordination for whatever reason (e.g., the potential target has shifted location to a large extent, or a suitable corresponding image was not identified), and may provide sensor module 110 with an updated image to coordinate with.

The first image 140 may also include more than one designated target point. For example, image processor 114 designates multiple non-contiguous target points on image 140 (e.g., one on the left window, one on the right window, and one on the roof of the house), and defines a plurality of feature points associated with each of the designated target points. Image processor 124 then identifies each one of the target points on the target image 150, by implementing the convergence operation independently for each designated target point. In addition, sensor module 120 may be directed to track the location of a particular designated target point in a series of different images, such as over a sequence of images representing the area of interest at changing time increments. Sensor module 120 may compile historical data relating to the target point location over time (e.g., in the form of a visual representation), which may be provided to sensor module 110. Further optionally, sensor module 120 may receive a copy of the first image 140 with the designated target point 142, and then display 128 may present at least a portion of image 140 showing designated target point 142 superimposed onto the second image 150 along with the corresponding target point 152 (or vice-versa). Similarly, sensor module 110 may receive a copy of the second image 150 showing the identified target point 152, allowing display 118 to display at least a portion of second image 150 superimposed onto first image 140 (or vice-versa).

Figure 4:
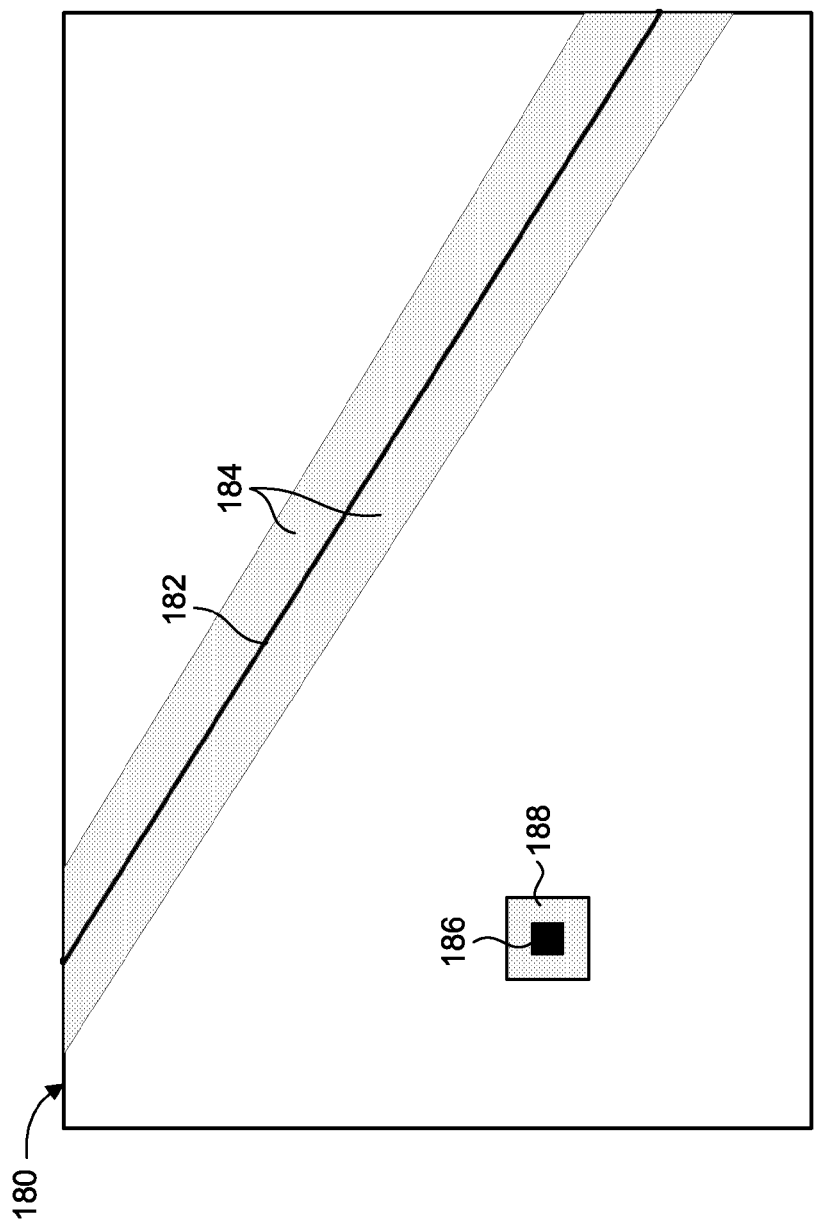
FIG. 4 is a schematic illustration of a target image showing restricted regions for implementation of the convergence operation in conjunction with supplemental data, operative in accordance with an embodiment of the disclosed technique.

The performance of the system and method of the disclosed technique may be improved, in terms of both accuracy and/or processing speed, by taking into account additional information which may be obtained using supplementary sensors or measurement devices. For example, system 110 may determine in real-time at least one parameter or imaging characteristic associated with at least one of image sensors 112 and 122, such as: their position (e.g., using a global positioning system (GPS) or an alternative position measurement apparatus); their viewing angle (e.g., using a compass, an inertial navigation system (INS) or an alternative orientation measurement apparatus); their range from the imaged scene or a particular target in the area of interest (e.g., using a rangefinder or an alternative range measurement apparatus); and/or the focal length, field of view, lens aberrations, or other calibration settings of the imaging sensors. The measured supplementary data may be used to restrict the portion of the second image in which the iterative convergence operation is implemented, and to decrease potential sources of error. For example, if the position of image sensor 112 with respect to the position of image sensor 122 is known, and if the orientation of image sensor 112 with respect to the orientation of image sensor 122 is also known, then the iterative convergence operation may be restricted on second image 150 to the vicinity of a line. If in addition to the position and orientation, the range from image sensors 112, 122 to the imaged scene (or to an object at the imaged scene) is also known, then the iterative convergence operation may be further restricted on second image 150 to the vicinity of a point. Reference is now made to FIG. 4, which is a schematic illustration of a target image, generally referenced 180, showing restricted regions for implementation of the convergence operation in conjunction with supplemental data, operative in accordance with an embodiment of the disclosed technique. Line 182 represents an exemplary viewing angle of the reference image in terms of target image 180, where margins 184 represent the deviations from the true viewing angle arising from telemetric errors. Accordingly, the iterative convergence operation can be implemented in the region defined by line 182 and margins 184 if the position and orientation of each of the two image sensors (i.e., that acquire the reference image and the target image, respectively) are known in advance. Similarly, point 186 represents an exemplary range of the reference image from the imaged scene in terms of target image 180, where margins 188 represent the deviations from the true range arising from telemetric errors. Accordingly, the iterative convergence operation can be implemented in the region defined by point 186 and margins 188 if the position, the orientation, and the range of each of the two image sensors with respect to the imaged scene are known in advance.

Figure 5:
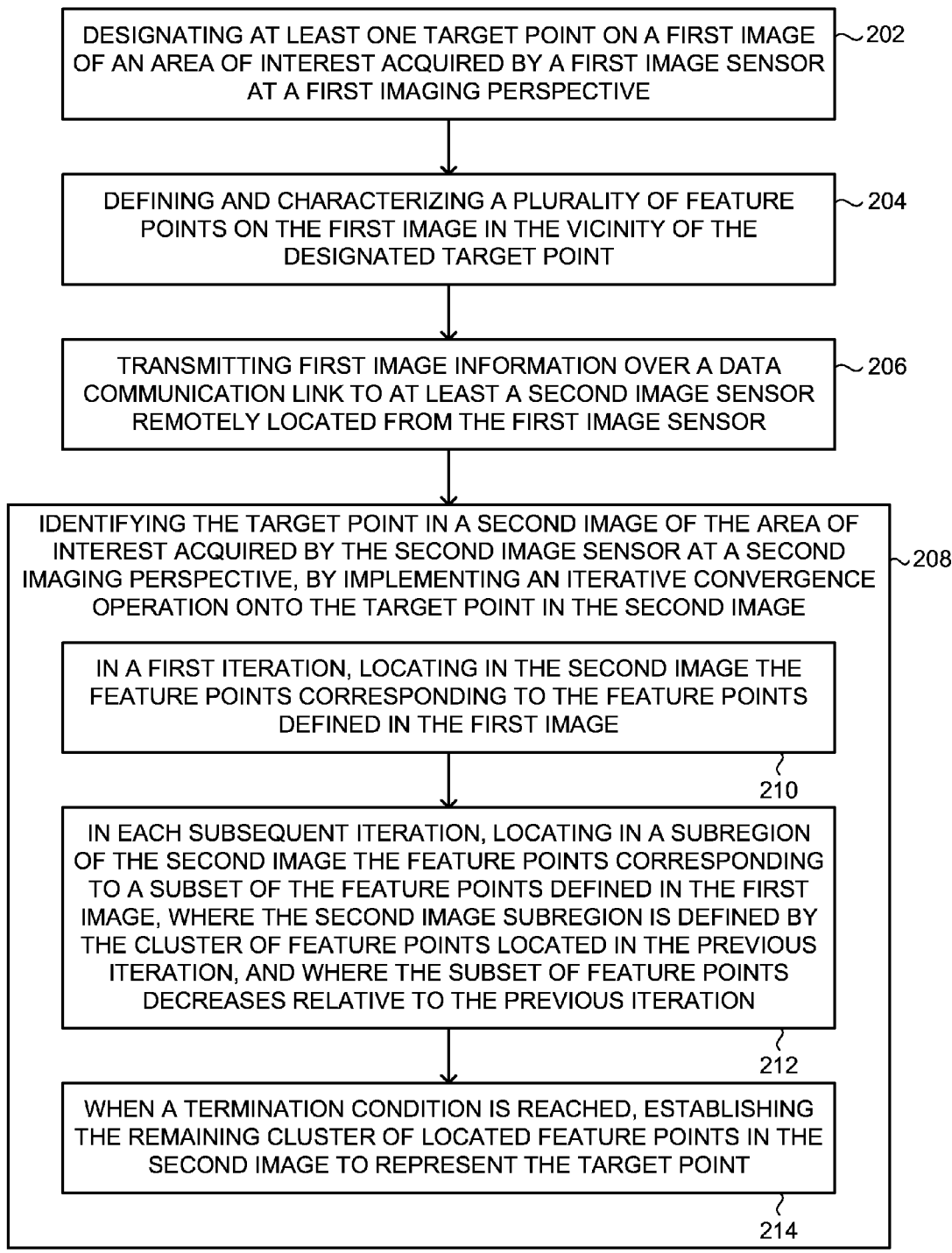
FIG. 5 is a block diagram of a method for coordinating between two remote image sensors imaging a mutual area of interest at different imaging perspectives, operative in accordance with an embodiment of the disclosed technique.

Reference is now made to FIG. 5, which is a block diagram of a method for coordinating between two remote image sensors imaging a mutual area of interest at different imaging perspectives, operative in accordance with an embodiment of the disclosed technique. In procedure 202, at least one target point is designated on a first image of an area of interest acquired by a first image sensor at a first imaging perspective. Referring to FIGS. 1 and 2, image sensor 112 of sensor module 110 acquires an image 140, and the first operator designates the center of the right side window of the house as a target point 142.

In procedure 204, a plurality of feature points are defined and characterized on the first image in the vicinity of the designated target point. Referring to FIGS. 1 and 2, image processor 114 defines multiple feature points on image 140 surrounding the right side window of the house, where each feature point is associated with a signature. The number of feature points and their distance from the target point may be adaptive functions of certain parameters, such as the bandwidth of channel 130 and the operational requirements of system 100. For example, if channel 130 has a substantially large (or unlimited) bandwidth, then image processor 114 may define a relatively large number of feature points which span a relatively large portion of image 140, whereas if channel 130 has a limited bandwidth then relatively fewer feature points are defined (and/or transmitted).

In procedure 206, information associated with the first image is transmitted over a data communication link to at least a second image sensor remotely located from the first image sensor. Referring to FIG. 1, sensor module 110 transmits data relating to image 140 to sensor module 120 over data communication channel 130. For example, sensor module 110 transmits all of the feature points defined and characterized by image processor 114. Alternatively, sensor module 110 may transmit image 140 itself (or a portion of image 140) to sensor module 120, which proceeds to perform the designation and characterization of feature points on image 140. The transmitted data may be compressed prior to transmission, such as if the data communication channel is a narrowband channel.

In procedure 208, the target point is identified in a second image of the area of interest acquired by the second image sensor at a second imaging perspective, by implementing an iterative convergence operation onto the target point in the second image. In particular, in a first iteration of the iterative convergence operation (sub-procedure 210), the feature points corresponding to the feature points defined in the first image are located in the second image. In each subsequent iteration of the iterative convergence operation (sub-procedure 212), the feature points corresponding to a subset of the feature points defined in the first image are located in a subregion of the second image, where the second image subregion is defined by the cluster of feature points located in the previous iteration, and where the subset of feature points decreases relative to the previous iteration. When a termination condition of the iterative convergence operation is reached (sub-procedure 214), the remaining cluster of located feature points in the second image is established to represent the target point. Referring to FIGS. 1 and 2, image processor 124 successively identifies feature points on image 150 that correspond to gradually decreasing subsets of the feature points defined on image 140. For example, image processor 124 initially identifies a first cluster of points within region 154 of image 150 that correspond to at least a portion of a first subset of feature points located within image region 144 of image 140. Subsequently, image processor 124 identifies a second cluster of points within region 156 of image 150 corresponding to at least a portion of a second subset of feature points located within image region 146 of image 140, where region 146 is smaller than (encompassed within) region 144. Image processor 124 continues identifying corresponding feature points in gradually decreasing subregions of image 150 over multiple iterations until a termination condition is reached. For example, when the size of the subregion of identified feature points in image 150 reaches some predefined margin or threshold level (e.g., within a sub-pixel resolution) or is not less than that of the previous iteration, then the remaining cluster of identified feature points within that subregion are established to represent the designated target point 142 of image 140. The corresponding feature points between the images 140, 150 may be determined based on the correlation of their associated signatures. A quantitative index may be established for measuring the accuracy of the iterative convergence operation, such as by determining a comparison metric for the degree of correlation between the feature point pairings in images 140 and 150.

While the system and method of the disclosed technique has been described hereinabove with regard to two separate image sensors, the disclosed technique is more generally applicable to coordinating between any number of image sensors. In particular, a first sensor module (e.g., sensor module 110) may transmit the feature points associated with a designated target point to a plurality of other sensor modules (e.g., in addition to sensor module 120), such that each of those sensor modules implements the iterative convergence operation independently and identifies a corresponding target point on their respective images. For example, a commander of a military sniper unit may be in communication with multiple snipers on a battlefield, where the commander and each of the snipers are viewing the potential target at a different viewing angle through the sighting device of their respective weapons. The commander may then coordinate his image of the target with the respective images of each of the snipers, in accordance with the disclosed technique (i.e., identifying a target point on the commander's image, defining and characterizing feature points, transmitting the information to a plurality of snipers, then implementing iterative convergence onto the target point at each of the snipers).

The disclosed technique is applicable to image acquisition for any purpose, and may be employed in a wide variety of applications. For example, the disclosed technique may be utilized for various military objectives, such as for guiding troops, directing weaponry, or focusing surveillance cameras. Another example is for police or security related applications, such as for assisting the deployment of security personnel at a crime scene, or for directing security cameras towards a particular target area. Yet another example is for navigational applications, such as for providing directions to a specific location at a particular street or building. A further example is in the field of augmented reality (AR), such as to assist with the projection of computer-generated graphical imagery onto a real-world environment in order to modify the viewer's perception of that environment (e.g., the presentation of advertisements or contextual information to the viewer).

It will be appreciated by persons skilled in the art that the disclosed technique is not limited to what has been particularly shown and described hereinabove.

The invention claimed is:

1. A method for coordinating between separate image sensors, each imaging a mutual area of interest at a different imaging perspective, the method comprising the procedures of:
   designating at least one target point on a first image of an area of interest acquired via a first image sensor at a first imaging perspective;
   defining and characterizing a plurality of feature points on said first image in the vicinity of the designated target point;
   transmitting information associated with said first image over a data communication link to at least a second image sensor situated at a separate location from said first image sensor; and
   identifying said target point in at least a second image of said area of interest acquired by said second image sensor at a second imaging perspective, by implementing an iterative convergence operation towards the target point location in said second image,
wherein said iterative convergence operation comprises:
in a first iteration, locating in said second image the feature points corresponding to the feature points defined in said first image;
in each subsequent iteration, locating in a subregion of said second image the feature points corresponding to a subset of the feature points defined in said first image, where said subregion is defined by the cluster of feature points located in the previous iteration, and where said subset of feature points decreases relative to the previous iteration; and
when a termination condition is reached, establishing the remaining cluster of located feature points in said second image to represent said target point.

2. The method of claim 1, wherein said procedure of defining and characterizing a plurality of feature points comprises establishing a respective signature for each feature point, and wherein locating corresponding feature points comprises comparing the signatures of the respective points and selecting the point with the closest signature.

3. The method of claim 1, wherein said imaging perspective is selected from the list consisting of:
position of said image sensor;
viewing angle of said image sensor;
range of said image sensor to said area of interest;
field of view of said image sensor;
focal length of said image sensor;
optical resolution of said image sensor;
dynamic range of said image sensor;
sensitivity of said image sensor;
signal-to-noise ratio (SNR) of said image sensor; and
lens aberrations of said image sensor.

4. The method of claim 1, further comprising the procedure of calculating a quantitative index related to the level of accuracy of said iterative convergence operation, said quantitative index being a function of the degree of correlation between feature point pairings in said first image and said second image.

5. The method of claim 1, wherein said termination condition is selected from the list consisting of:
when said subset of feature points are located within a predetermined margin from said target point;
when the size of said subset of feature points is within a threshold;
when the size of said subregion of said second image is within a threshold;
when the size of said subregion of said second image has not decreased from the previous iteration;
when no corresponding feature points are located in said second image;
when the number of corresponding feature points located in said second image is below a threshold; and
after a selected number of iterations.

6. The method of claim 1, further comprising the procedure of obtaining at least one parameter of at least one of: said first image sensor; and said second image sensor.

7. The method of claim 6, wherein said parameter is selected from the list consisting of:
global position of said image sensor;
relative position of said image sensor with respect to said area of interest;
viewing angle of said image sensor;
range from said image sensor to said area of interest;
focal length of said image sensor;
field of view of said image sensor;
lens aberrations of said image sensor; and
at least one imaging characteristic of said image sensor.

8. The method of claim 6, further comprising the procedure of limiting the area in said second image for implementing said iterative convergence operation based on said at least one parameter.

9. The method of claim 1, wherein said information associated with said first image comprises said feature points.

10. The method of claim 1, wherein said procedure of transmitting said information comprises transmission over a narrowband channel.

11. The method of claim 1, further comprising the procedure of providing an indication that said designated target point cannot be identified in said second image, if a sufficient number of feature points cannot be located in said second image in at least one iteration of said iterative convergence operation.

12. The method of claim 1, further comprising the procedure of tracking the location of said designated target point over time in a sequence of images of said area of interest.

13. A system for coordinating between separate image sensors, each imaging a mutual area of interest at a different imaging perspective, the system comprising:
a first image sensor, operative for acquiring at least one image of an area of interest at a first imaging perspective;
a first image processor, coupled with said first image sensor, said first image processor operative for designating at least one target point in a first acquired image, and defining and characterizing a plurality of feature points on said first image in the vicinity of the designated target point;
a second image sensor, situated at a separate location from said first image sensor, operative for receiving information associated with said first image transmitted from said first image sensor over a data communication link; and
a second image processor, coupled with said second image sensor, said second image processor operative for identifying said target point in at least a second image of said area of interest acquired by said second image sensor at a second imaging perspective, by implementing an iterative convergence operation towards the target point location in said second image,
wherein said iterative convergence operation comprises:
in a first iteration, locating in said second image the feature points corresponding to the feature points defined in said first image;
in each subsequent iteration, locating in a subregion of said second image the feature points corresponding to a subset of the feature points defined in said first image, where said subregion is defined by the cluster of feature points located in the previous iteration, and where said subset of feature points decreases relative to the previous iteration; and
when a termination condition is reached, establishing the remaining cluster of located feature points in said second image to represent said target point.

14. The system of claim 13, wherein said imaging perspective is selected from the list consisting of:
position of said image sensor;
viewing angle of said image sensor;
range of said image sensor to said area of interest;
field of view of said image sensor;
focal length of said image sensor;

optical resolution of said image sensor;
dynamic range of said image sensor;
sensitivity of said image sensor;
signal-to-noise ratio (SNR) of said image sensor; and
lens aberrations of said image sensor.

15. The system of claim 13, wherein said system further calculates a quantitative index related to the level of accuracy of said iterative convergence operation, said quantitative index being a function of the degree of correlation between feature point pairings in said first image and said second image.

16. The system of claim 13, further comprising at least one measurement unit, operative for obtaining at least one parameter of at least one of: said first image sensor; and said second image sensor.

17. The system of claim 16, wherein said at least one measurement unit is selected from the list consisting of:
a global positioning system (GPS);
a compass;
an inertial navigation system (INS); and
a rangefinder.

18. The system of claim 13, wherein said information associated with said first image comprises said feature points.

19. The system of claim 13, wherein said data communication link comprises a narrowband channel.

20. The system of claim 13, further comprising a display, operative to display at least one of said first image and said second image.

* * * * *